United States Patent
Milvaney et al.

(10) Patent No.: US 10,540,431 B2
(45) Date of Patent: Jan. 21, 2020

(54) EMOJI REACTIONS FOR FILE CONTENT AND ASSOCIATED ACTIVITIES

(71) Applicant: Microsoft Technology Licensing, LLC, Redmond, WA (US)

(72) Inventors: Douglas L. Milvaney, Cambridge, MA (US); Aleksandr Polyakov, Somerville, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 800 days.

(21) Appl. No.: 14/948,532

(22) Filed: Nov. 23, 2015

(65) Prior Publication Data

US 2017/0147185 A1 May 25, 2017

(51) Int. Cl.
*G06F 17/24* (2006.01)
*G06F 3/0484* (2013.01)
*G06F 3/0481* (2013.01)
*G06F 3/0482* (2013.01)
*H04L 12/58* (2006.01)

(52) U.S. Cl.
CPC .......... *G06F 17/241* (2013.01); *G06F 3/0482* (2013.01); *G06F 3/04817* (2013.01); *G06F 3/04842* (2013.01); *H04L 51/16* (2013.01)

(58) Field of Classification Search
CPC .. G06F 17/241; G06F 3/0237; G06F 3/04842; G06F 3/04817; G06F 3/0482; H04L 51/16; H04H 60/33; H04N 21/4756; H04N 21/4758
See application file for complete search history.

(56) References Cited

U.S. PATENT DOCUMENTS

| | | | |
|---|---|---|---|
| 8,495,503 B2 | 7/2013 | Brown et al. | |
| 8,656,294 B2 | 2/2014 | Wassingbo | |
| 2006/0247914 A1 | 11/2006 | Brener et al. | |
| 2007/0276814 A1 | 11/2007 | Williams | |
| 2010/0153880 A1 | 6/2010 | Dinn | |
| 2011/0289404 A1 | 11/2011 | Fleur et al. | |
| 2013/0339983 A1 | 12/2013 | Dai et al. | |
| 2014/0088954 A1 | 3/2014 | Shirzadi et al. | |
| 2014/0164981 A1 | 6/2014 | Colley et al. | |
| 2014/0279418 A1* | 9/2014 | Rubinstein | G06Q 40/00 705/39 |
| 2014/0289645 A1* | 9/2014 | Megiddo | G06F 3/048 715/753 |

(Continued)

OTHER PUBLICATIONS

Frem, Peter, "Comments and Revisions in Word 2013", In the MS Office Blog, Aug. 28, 2012, 8 Pages.

(Continued)

*Primary Examiner* — Nicholas Ulrich

(57) ABSTRACT

Aspects of the present disclosure relate to systems and methods for extending emoji reactions into file specific content. In one aspect, a file created with an application may be rendered on a user interface. One or more activities associated with the file created with the application may be obtained. In one example, the one or more activities include corresponding activity metadata. A file activity feed including the one or more activities associated with the file may be rendered within the file. The one or more activities may include at least an emoji icon displayed within at least one of the one or more activities.

20 Claims, 8 Drawing Sheets

(56) References Cited

U.S. PATENT DOCUMENTS

2014/0372527 A1* 12/2014 Zaveri .................. H04L 51/046
                                                          709/204
2015/0095020 A1   4/2015 Leydon
2016/0048492 A1*  2/2016 Barrett ................. G06F 17/241
                                                          715/233

OTHER PUBLICATIONS

Frem, Peter, "Zoom on Comment List", Retrieved from <<https://blogs.office.com/wp-content/uploads/migrated-images/45/0434.one%20comment%20selected%20in%20all%20markup.png>>, Aug. 28, 2012, 1 Page.

"International Search Report and Written Opinion Issued in PCT Application No. PCT/US2016/062123", dated Jan. 26, 2017, 12 Pages.

"International Preliminary Report on Patentability Issued in PCT Application No. PCT/US2016/062123", dated Oct. 13, 2017, 8 Pages.

Andrews, A.J., "How to Insert a Color Smiley in Microsoft Word", Published on: Dec. 30, 2012, Available at: http://smallbusiness.chron.com/insert-color-smiley-microsoft-word-41227.html.

"How to Make Smiley Faces in Microsoft Word", Published on: May 25, 2013, Available at: https://www.youtube.com/watch?v=rAjjJRtU424.

"Dashboarding Fun—Display Smileys in your excel dashboards", Published on: Aug. 7, 2008, Available at: http://chandoo.org/wp/2008/08/07/display-smileys-excel-dashboards/.

722 Ways to say "I got your Message", Published on: Jul. 8, 2015, Available at: http://slackhq.com/post/123561085920/reactions.

"Second Written Opinion Issued in PCT Application No. PCT/US2016/062123", dated May 18, 2017, 7 Pages.

* cited by examiner

EMOJI REACTIONS FOR FILE CONTENT AND ASSOCIATED ACTIVITIES

BACKGROUND

Current applications for processing information such as word processing applications, spreadsheet applications, and electronic slide presentation applications, may facilitate co-authoring and collaborating among users of the applications. In this regard, users may make changes to content within files created with the applications such that each co-author is informed of the changes. Additionally, users may comment on the content within the files of the applications such that each co-author can view the comments. Current techniques for communicating within these files include replying with a threaded comment. This technique for communicating within these files may be cumbersome and distracting. Furthermore, there is currently no way to express emotion while working and communicating within files of information processing applications. In turn, current techniques for communicating within files of information processing applications are inefficient and inadequate.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In summary, the disclosure generally relates to systems and methods for extending emoji reactions into file specific content. In one aspect, a file created with an application may be rendered on a user interface. One or more activities associated with the file may be obtained. In one example, the one or more activities include corresponding activity metadata. A file activity feed including the one or more activities associated with the file may be rendered within the file. The one or more activities may include at least an emoji icon displayed within at least one of the one or more activities.

In another aspect, one or more emoji within a file created with an application may be suggested. In one case, the file may be rendered on a user interface. One or more activities associated with the file may be obtained. The one or more activities may include corresponding activity metadata. A file activity feed including the one or more activities associated with the file may be rendered within the file. It may be determined whether to suggest one or more emoji based on at least one of the activity metadata, a type of content within the file, and an existing emoji in a reaction stack. In response to determining to suggest one or more emoji based on at least one of the activity metadata, the type of content within the file, and the existing emoji in a reaction stack, a navigable menu including at least the suggested emoji may be displayed.

DESCRIPTION OF THE DRAWINGS

The detailed description is made with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Figure 1:
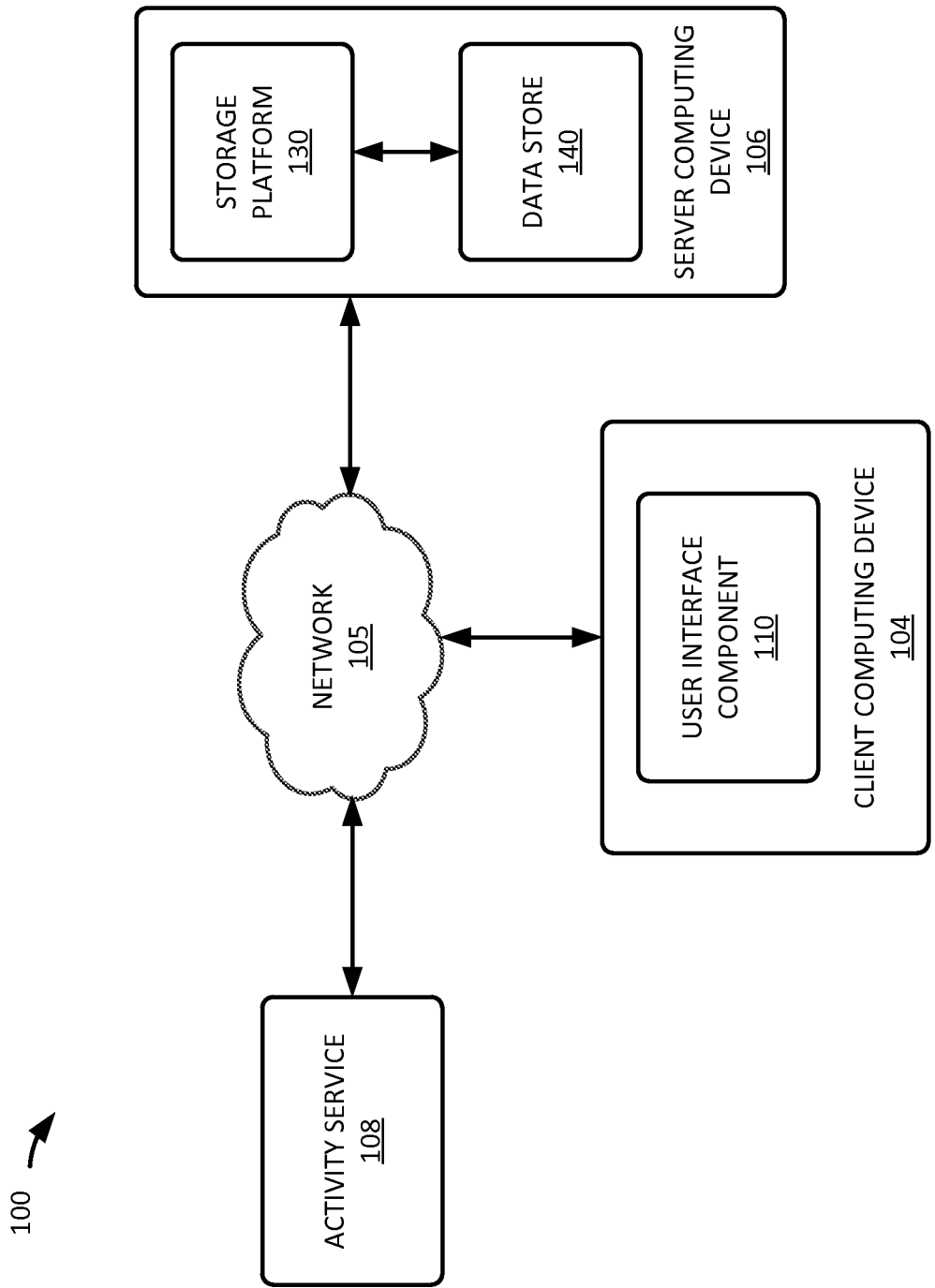
FIG. 1 illustrates an exemplary emoji system for extending emoji reactions into file specific content, according to an example aspect.

Aspects of the disclosure are generally directed to extending emoji reactions into file specific content. For example, an emoji icon and an associated navigable menu including a plurality of emoji may be included in files created with information processing applications such as word processing applications, spreadsheet applications, and electronic slide applications. In this regard, users and/or or co-authors of the files created with the information processing applications may present in-line reactions to file activities using one or more emoji. The file activities may include activities related to the file and/or activities that surround the file. In some examples, the activities related to the file may include activities such as content changes in the file (e.g., edits and deletions), sharing the file, renaming the file, comments within the file, messaging, and the like. In some examples, the activities that surround the file may include activities such as conversations around the document (e.g., email communications and/or messaging communication that discuss and/or reference the file), and the like.

In one aspect, one or more activities associated with a file created with an application may be obtained. The one or more activities may include corresponding activity metadata. A file activity feed including the one or more activities may be rendered within the file. The one or more activities may include at least an emoji icon displayed within the one or more activities. In some cases, the one or more activities may include corresponding activity metadata and at least an emoji icon displayed within at least one of the one or more activities. A navigable menu including a plurality of emoji may be displayed in response to receiving a selection of the emoji icon. In response to receiving a selection of at least one of the emoji of the plurality of emoji, the at least one selected emoji may be displayed within the one or more activities. As such, users and/or co-authors of the file may present in-line reactions to file activities using one or more emoji. In turn, users and/or co-authors may express emotion and/or feeling while collaborating on files created with information processing applications.

As discussed above, current techniques for communicating within files created with information processing applications include commenting on the content within the files such that each co-author can view the comments and replying to comments with a threaded comment. Replying to comments within a threaded comment may be cumbersome and distracting. Furthermore, there is currently no way to express emotion while working and communicating within files of information processing applications. In turn, current techniques for communicating within files of information processing applications are inefficient and inadequate. Accordingly, aspects described herein include extending emoji reactions into file specific content. In one example, a co-author may leave a comment regarding whether to delete content within a file. Instead of users/co-authors of the file replying to the comment with yes or no, the users/co-authors may use a voting emoji showing a thumbs up or thumbs down to vote on whether to delete the content within the file. The voting emoji may be displayed within the comment as a thumbs up and/or thumbs down to indicate who agrees and/or disagrees with deleting content within the file. In this regard, users/co-authors may show agreement and/or disagreement relative to content within the file in a clear, concise, and efficient manner. As such, a technical effect that may be appreciated is that extending emoji reactions into file specific content may facilitate presenting in-line reactions to one or more activities associated with a file in a clear and understandable manner and on a functional surface. In turn, collaboration on documents may be accomplished in a faster and/or more efficient manner, ultimately reducing processor load, conserving memory, and reducing network bandwidth usage.

In another aspect, it may be determined whether to suggest one or more emoji based on at least one of activity metadata, a type of content within the file, and an existing emoji in a reaction stack. For example, in response to receiving a selection of an emoji icon displayed within one or more activities in a file activity feed, one or more suggested emoji may be presented in a selected (e.g., top) portion of a navigable menu including a plurality of emoji. In this regard, a user/co-author may clearly identify and select an emoji related to file specific content from the navigable menu for presenting a reaction to and/or expressing emotion to one or more activities (e.g., file specific content) associated with a file. As such, another technical effect that may be appreciated is that suggesting one or more emoji facilitates a compelling visual and functional experience to allow a user to efficiently interact with a user interface for presenting in-line reactions and expressing emotions to one or more activities associated with the file.

Referring now to the drawings, in which like numerals represent like elements through the several figures, aspects of the present disclosure and the exemplary operating environment will be described. With reference to FIG. 1, one aspect of an emoji system 100 for extending emoji reactions into file specific content is illustrated. The emoji system 100 may include a client computing device 104, a server computing device 106, and an activity service 108. In aspects, the emoji system 100 may be implemented on the client computing device 104. In a basic configuration, the client computing device 104 is a handheld computer having both input elements and output elements. The client computing device 104 may be any suitable computing device for implementing the emoji system 100 for extending emoji reactions into file specific content. For example, the client computing device 104 may be at least one of: a mobile telephone; a smart phone; a tablet; a phablet; a smart watch; a wearable computer; a personal computer; a desktop computer; a laptop computer; a gaming device/computer (e.g., Xbox); a television; and etc. This list is exemplary only and should not be considered as limiting. Any suitable client computing device 104 for implementing the emoji system 100 for extending emoji reactions into file specific content may be utilized.

In aspects, the emoji system 100 may be implemented on the server computing device 106. The server computing device 106 may provide data to and from the client computing device 104 through a network 105. In aspects, the emoji system 100 may be implemented on more than one server computing device 106, such as a plurality of server computing devices 106. As discussed above, the server computing device 106 may provide data to and from the client computing device 104 through the network 105. The data may be communicated over any network suitable to transmit data. In some aspects, the network is a distributed computer network such as the Internet. In this regard, the network may include a Local Area Network (LAN), a Wide Area Network (WAN), the Internet, wireless and wired transmission mediums. In this regard, emoji reactions may be extended into file specific content of one or more information processing applications.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval, and various processing functions may be operated remotely from each other over a distributed computing network, such as the Internet or an Intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As discussed above, the emoji system 100 may include the client computing device 104, the server computing device 106, and the activity service 108. The various components may be implemented using hardware, software, or a combination of hardware and software. In aspects, the client computing device 104 may include a user interface component 110. The user interface component 110 may be configured to display an emoji icon within one or more activities associated with a file. In response to receiving a selection of the emoji icon, the user interface component 110 may display a navigable menu including a plurality of emoji for presenting in-line reactions to the one or more activities using the plurality of emoji. For example, the user interface component 110 may initiate rendering of a file created with an application on a user interface of the client computing device 104. In one example, an application may include any application suitable for collaboration and/or co-authoring such as a word processing application, spreadsheet application, electronic slide presentation application, email application, chat application, voice application, and the like. In one case, a file associated with and/or created with the application may include a word document, a spreadsheet, an electronic slide presentation, an email, a chat conversation, and the like. As such, an exemplary application may be an electronic slide presentation application. In this example, an exemplary file associated with the electronic slide presentation application may include an electronic slide presentation. In one example, an information processing application may include a word processing application, a spreadsheet application, and an electronic slide presentation.

In another example, the user interface component 110 and/or the file rendered on the user interface may obtain one or more activities associated with the file created with the application. In one example, the one or more of activities may include both client side activities and server side activities. For example, the one or more activities may include activities associated with the client computing device 104 and activities associated with the server computing device 106. In one example, the plurality of activities may include content changes, communication activities, document content exchanges, permission requests, sharing, printing, and the like. In aspects, the server computing device 106 is unaware of the plurality of activities associated with the client computing device 104 and the client computing device 104 is unaware of the plurality of activities associated with the server computing device 106. In one example, the plurality of activities associated with the client computing device 104 may include messages, communication activities such as Instant Messaging and/or voice communications, comments, email activities, presentation of the file, printing the file, co-authoring the file, and the like. In one case, email activities may include sending an email, printing an email, and the like. In one example, the one or more activities associated with the server computing device 106 may receiving a shared file, renaming a file, sharing a file, editing a file, restoring a file, and the like.

In aspects, the one or more activities may include corresponding activity metadata. In one case, the activity metadata may include at least an identifier, a timestamp, a type of activity, a location, and a link. In one case, the identifier may be an identifier of a user and/or co-author of the file. In one example, the identifier may indicate the user and/or co-author who performed an activity. In another example, the identifier may indicate a recipient of an activity. In one example, the timestamp may indicate a time at which the activity was performed. In another example, the timestamp may indicate an amount of time that has passed since an activity was performed. The type of activity may indicate the type of activity that occurred relative to the file such as any of the activities described herein. In one example, the location may indicate where the activity is located within a file and/or relative to a file. In one case, the link may provide access to the file associated with the activity. For example, if the activity is an email activity and user/co-author is in an email application, upon receiving a selection of the link, the user/co-author may access the file associated with the email activity.

In aspects, the user interface component 110 may render, within the file, a file activity feed including the one or more activities associated with the file. In one example, the one or more activities include at least an emoji icon displayed within at least one of the one or more activities. The emoji icon may be any icon suitable for providing a navigable menu including a plurality of emoji upon selection. For example, in response to receiving a selection of the emoji icon, a navigable menu including a plurality of emoji may be displayed within the file. In one example, the emoji icon may be a smiley face. In one example, the plurality of emoji may include a set of standard emoji. In one case, the set of standard emoji are part of a Unicode standard as known by those skilled in the art. In one case, when the navigable menu is displayed, one or more emoji may be suggested based on a type of activity. As discussed above, the type of activity may include various activities such as content changes, comments, emails, renaming a file, printing a file, etc. In this regard, one or more emoji associated with the type of activity may be suggested in a selected and/or preferred (e.g., top) portion of the navigable menu. In another example, one or more emoji most often used with the type of activity may be suggested in the selected and/or preferred portion of the navigable menu. In another case, when the navigable menu is displayed, one or more emoji may be suggested based on a type of content within the file. In one example, one or more emoji associated with the type of content within the file may be suggested in the selected and/or preferred portion of the navigable menu. For example, if the type of content within the file is business related content, one or more business related emoji may be suggested. In another example, one or more emoji most often used with the type of content within the file may be suggested in a top portion of the navigable menu. In another case, when the navigable menu is displayed, one or more emoji may be suggested based on an existing emoji in a reaction stack. For example, if a first co-author has selected a smiley face emoji for presenting an in-line reaction to an activity, a smiley face may be suggested in the selected and/or preferred portion of the navigable menu when a second co-author selects the emoji icon displayed within the same activity.

In one example, the user interface component 110 may be a touchable user interface that is capable of receiving input via contact with a screen of the client computing device 104, thereby functioning as both an input device and an output device. For example, content may be displayed, or output, on the screen of the client computing device 104 and input may be received by contacting the screen using a stylus or by direct physical contact of a user, e.g., touching the screen. Contact may include, for instance, tapping the screen, using gestures such as swiping or pinching the screen, sketching on the screen, etc.

In another example, the user interface component 110 may be a non-touch user interface. In one case, a tablet device, for example, may be utilized as a non-touch device when it is docked at a docking station (e.g., the tablet device may include a non-touch user interface). In another case, a desktop computer may include a non-touch user interface. In this example, the non-touchable user interface may be capable of receiving input via contact with a screen of the client computing device 104, thereby functioning as both an input device and an output device. For example, content may be displayed, or output, on the screen of the client computing device 104 and input may be received by contacting the screen using a cursor, for example. In this regard, contact may include, for example, placing a cursor on the non-touchable user interface using a device such as a mouse.

In some aspects, the client computing device 104 and/or the user interface component 110 may obtain the one or more activities from one or more sources. For example, the client computing device 104 and/or the user interface component 110 may obtain the one or more activities from the server computing device 106. The server computing device 106 may include a storage platform 130 and the data store 140. In this regard, the client computing device 104 and/or the user interface component 110 may obtain the one or more activities from at least the storage platform 130 and the data store 140. In one example, the storage platform 130 may be configured to store, manage, and access data and/or information associated with the emoji system 100. For example, the storage platform 130 may store one or more files and/or one or more activities associated with a file in a data store 140. In another example, the data store 140 may include attribution information. In one case, attribution information may include information regarding the user/author performing an activity and/or a recipient of the plurality of activities. In one example, data store 140 may be part of and/or located at the storage platform 130. In another example, data store 140 may be a separate component and/or may be located separate from the storage platform 130. It is appreciated that although one server computing device 106 is illustrated in FIG. 1, the emoji system 100 may include a plurality of server computing devices 106 with a plurality of storage platforms 130 and a plurality of data stores 140. In some cases, the server computing device 106 may include a plurality of storage platforms 130 and a plurality of data stores 140. For example, the plurality of storage platforms 130 may include at least file storage providers, external activity services and document editing clients. In one example, the storage platform 130 may be a cloud storage service such as OneDrive, SharePoint, Google Drive, Dropbox, and the like.

In another case, the client computing device 104 and/or the user interface component 110 may obtain the one or more activities from the activity service 108. The activity service 108 may be configured to receive, store, create, generate, update, manage, and access one or more activities and/or information associated with the emoji system 100. For example, the activity service 108 may receive, store, create, generate, update, and manage one or more activities associated with a file and/or activity metadata corresponding to the one or more activities associated with the file. In another example, the activity service 108 may provide access to the one or more activities associated with a file and/or activity metadata corresponding to the one or more activities associated with the file. In one case, the client computing device 104, the server computing device 106, and/or an application associated with the client computing device 104 and/or the server computing device 106 may access the activity service 108.

In aspects, the storage platform 130 may communicate with the client computing device 104 and/or the activity service 108. In this regard, the storage platform 130 may retrieve and/or obtain one or more activities associated with one or more files from the activity service 108. In one case, the storage platform 130 may retrieve and/or obtain activity metadata corresponding to the one or more activities from the activity service 108. In another case, the storage platform 130 may send activity metadata corresponding to one or more activities associated with one or more files to the activity service 108 for storage.

Figure 2A:
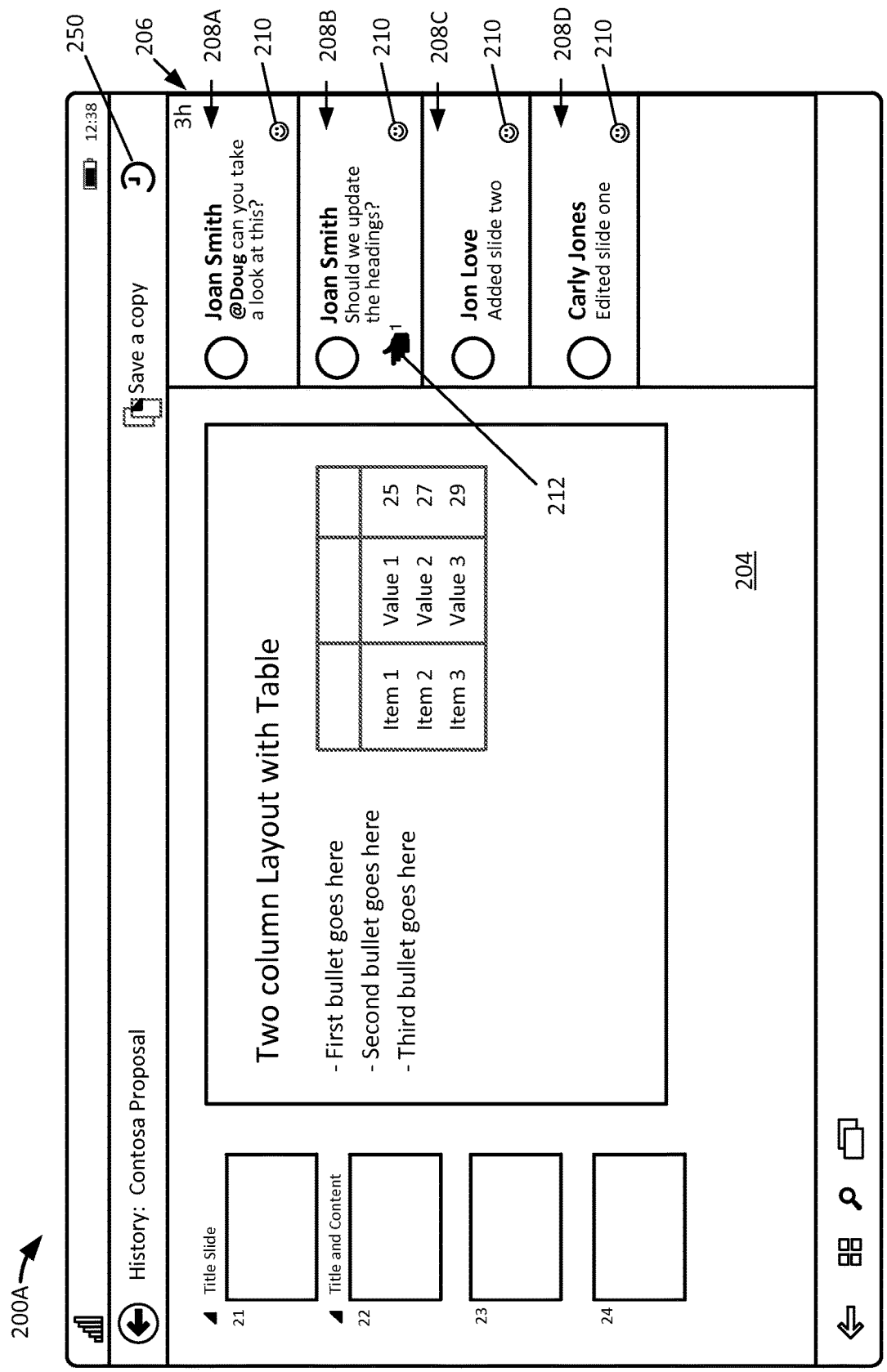
FIG. 2A illustrates one view in a progression of views an electronic slide application displayed on a user interface of a client computing device, according to an example aspect.

Referring now to FIG. 2A, one view 200A in a progression of views of an electronic slide application displayed on a user interface of the client computing device 104, such as a desktop computer, tablet computer or a mobile phone, for example, is shown. The exemplary application, as shown in FIG. 2A, is an electronic slide application. In one example, an application may include any information processing application suitable for collaboration and/or co-authoring such as a word processing application, spreadsheet application, and electronic slide presentation application. In one case, a file associated with the application may include a word document, a spreadsheet, and/or an electronic slide presentation. As such, an exemplary application may be an electronic slide presentation application, as illustrated in FIG. 2A. In this example, an exemplary file associated with the electronic slide presentation application may include an electronic slide presentation. As such, an exemplary file activity feed (e.g., the file activity feed associated with the electronic slide presentation) may include one or more activities associated with the electronic slide presentation.

As illustrated, the exemplary view 200A of the electronic slide presentation application displayed on the client computing device 104 includes a file 204, a file activity feed 206, a plurality of activities 208A-208D, and a file activity icon 250. The activities 208A-208D are exemplary activities of the file activity feed 206. It is appreciated that while FIG. 2A illustrates activities 208A-208D of the file activity feed 206, the discussion of activities 208A-208D and the file activity feed 206 is exemplary only and should not be considered as limiting. Any suitable number and/or type of activities of the file activity feed 206 may be displayed on the client computing device 104. Furthermore, while the present disclosure discusses the electronic slide presentation application, file 204, and file activity feed 206, this is only exemplary and should not be considered limiting. Any number of applications, files, and/or file activity feeds may be utilized in conjunction with the present disclosure.

As illustrated in FIG. 2A, the file activity feed 206 includes a plurality of activities 208A-208D associated with the file 204. In one example, the file activity feed 206 is rendered and displayed next to a canvas of the file 204. In one case, the file activity feed 206 is rendered within the file 204 in response to receiving a selection of the file activity icon 250. Activities 208A and 208B are activities of the type "comments," activity 208C is an activity of the type "adding content," and activity 208D is an activity of the type "edit". The plurality of activities 208A-208D may include an emoji icon 210. For example, the emoji icon 210 may be displayed within one or more of the plurality of activities 208A-208D. In this regard, a user/co-author may present an in-line reaction and/or express emotion for one or more activities associated with the file 204. In the example illustrated in FIG. 2A, the emoji icon 210 is a smiley face. It is appreciated that the emoji icon 210 may be any icon suitable for providing a navigable menu including a plurality of emoji upon selection. For example, in response to receiving a selection of the emoji icon 210, a navigable menu including a plurality of emoji may be displayed within the file 204, which will be described in detail below relative to FIGS. 2B-2D.

In aspects, at least one of the plurality of emoji includes a voting emoji for voting on the one or more activities 208A-208D associated with the file 204. For example, activity 208B includes both the emoji icon 210 and a voting emoji 212. In the example illustrated in FIG. 2A, the voting emoji 212 includes a thumbs up emoji. The thumbs up emoji may indicate that a user/co-author agrees (e.g., votes yes) with the content associated with the activity. For example, activity 208B is a comment asking whether headings should be updated. The voting emoji 212 may be used to show agreement and/or disagreement with updating the headings. In the example illustrated in FIG. 2A, the voting emoji 212 includes a thumbs up emoji including the number 1 to indicate a number of users/co-authors who agree with the comment. In this example, one user/co-author agrees with the comment.

Figure 2B:
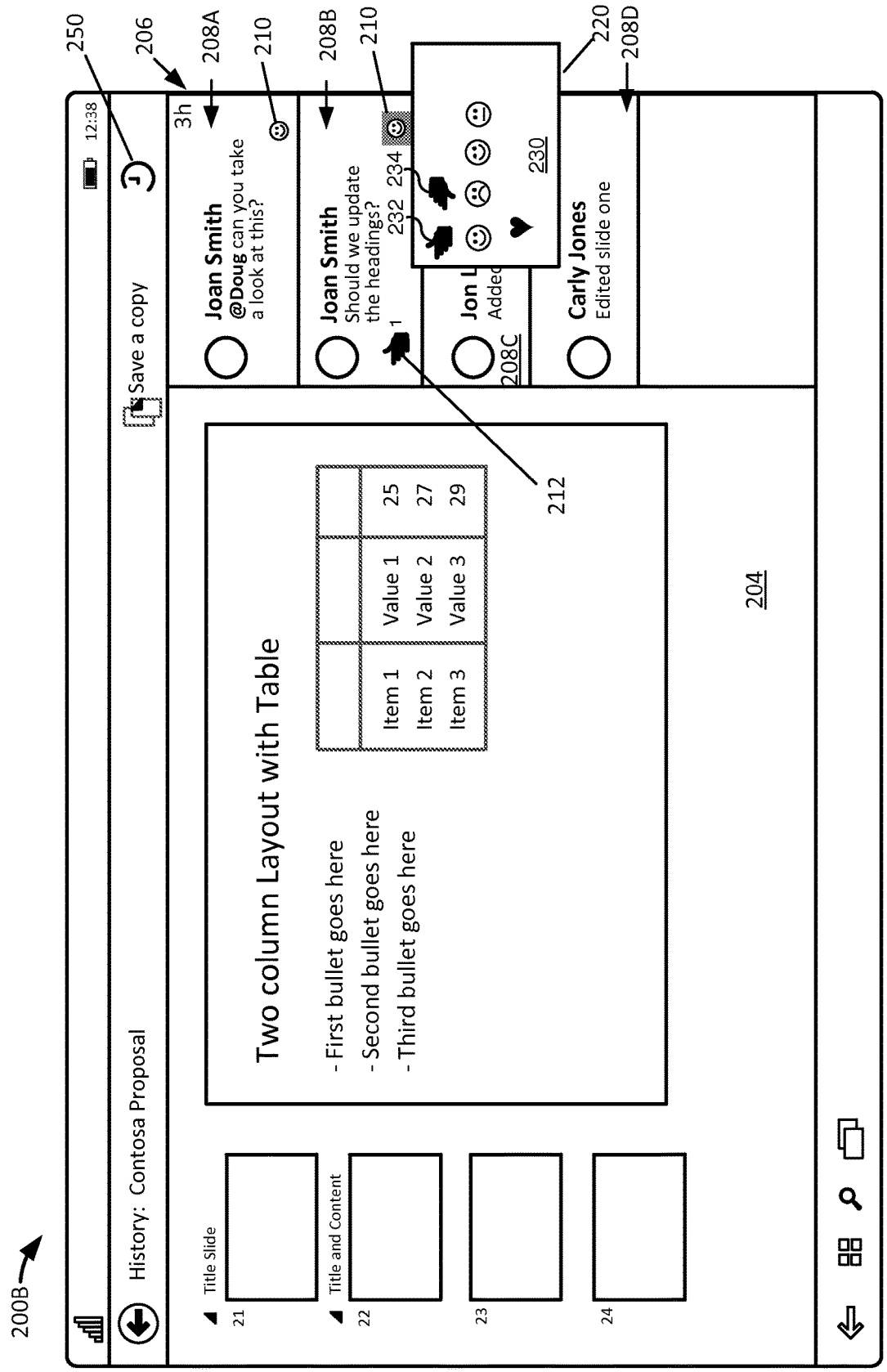
FIG. 2B illustrates another view in a progression of views of the electronic slide application of FIG. 2A, according to an example aspect.

Referring now to FIG. 2B, another view 200B in a progression of views of the electronic slide presentation application displayed on a user interface of the client computing device 104, such as a desktop computer, tablet computer or a mobile phone, for example, is shown. As illustrated, the exemplary view 200B of the electronic slide presentation application displayed on the client computing device 104 includes the file 204, the file activity feed 206, the plurality of activities 208A-208D, and the file activity icon 250. The plurality of activities 208A-208D described relative to FIG. 2B include the same and/or similar functionality as the plurality of activities 208A-208D described above relative to FIG. 2A. For example, one or more of the plurality of activities 208A-208D may include the emoji icon 210 displayed therein. In another example, the activity 208B may include the emoji icon 210 and the voting emoji 212 displayed therein.

As shown in FIG. 2B, the emoji icon 210 displayed within activity 208B is selected. As such, in response to receiving a selection of the emoji icon 210, a navigable menu 220 including a plurality of emoji 230 may be displayed. The navigable menu 220 including the plurality of emoji 230 may be rendered and/or displayed on the user interface. In some examples, navigable menu 220 including the plurality of emoji 230 may be rendered and/or displayed within the file 204. In other examples, navigable menu 220 including the plurality of emoji 230 may be rendered and/or displayed within the file 204 next to the file contents within the canvas. In one case, the navigable menu 220 including the plurality of emoji 230 may be rendered and/or displayed over the file activity feed 206. As discussed above, in one example, the navigable menu 220 may include suggested emoji. In another example, the navigable menu 220 may include a set of standard emoji.

In the example illustrated in FIG. 2B, the navigable menu 220 includes a first suggested emoji 232 and a second suggested emoji 234. In one example, the first suggested emoji 232 and the second suggested emoji 234 are presented in a selected and/or preferred portion (e.g., the top or first row) of the navigable menu 220. As discussed above, displaying the navigable menu 220 may include suggesting one or more emoji based on an existing emoji a reaction stack. In one case, the existing emoji in the reaction stack is displayed within at least one of the one or more activities (e.g., activities 208A-208D) associated with the file 204. As such, the existing emoji in the reaction stack may be an emoji that is already displayed within at least one of the one or more activities when a user/co-author selects the emoji icon 210. In one example, the voting emoji 212 (e.g., the thumbs up emoji) is an existing emoji in the reaction stack. For example, before receiving a selection of the emoji icon 210 to display the navigable menu 220, the voting emoji 212 is displayed within the activity 208B. In this regard, the first suggested emoji 232 is a thumbs up emoji and the second suggested emoji 234 is a thumbs down emoji. As such, the first suggested emoji 232 and the second suggested emoji 234 are suggested based on the existing emoji in the reaction stack (e.g., the voting emoji 212). In turn, a user/co-author may quickly and easily identify voting emoji in the navigable menu 220 for voting on the comment activity 208B (e.g., since one user/co-author has already voted on the comment activity 208B).

Figure 2C:
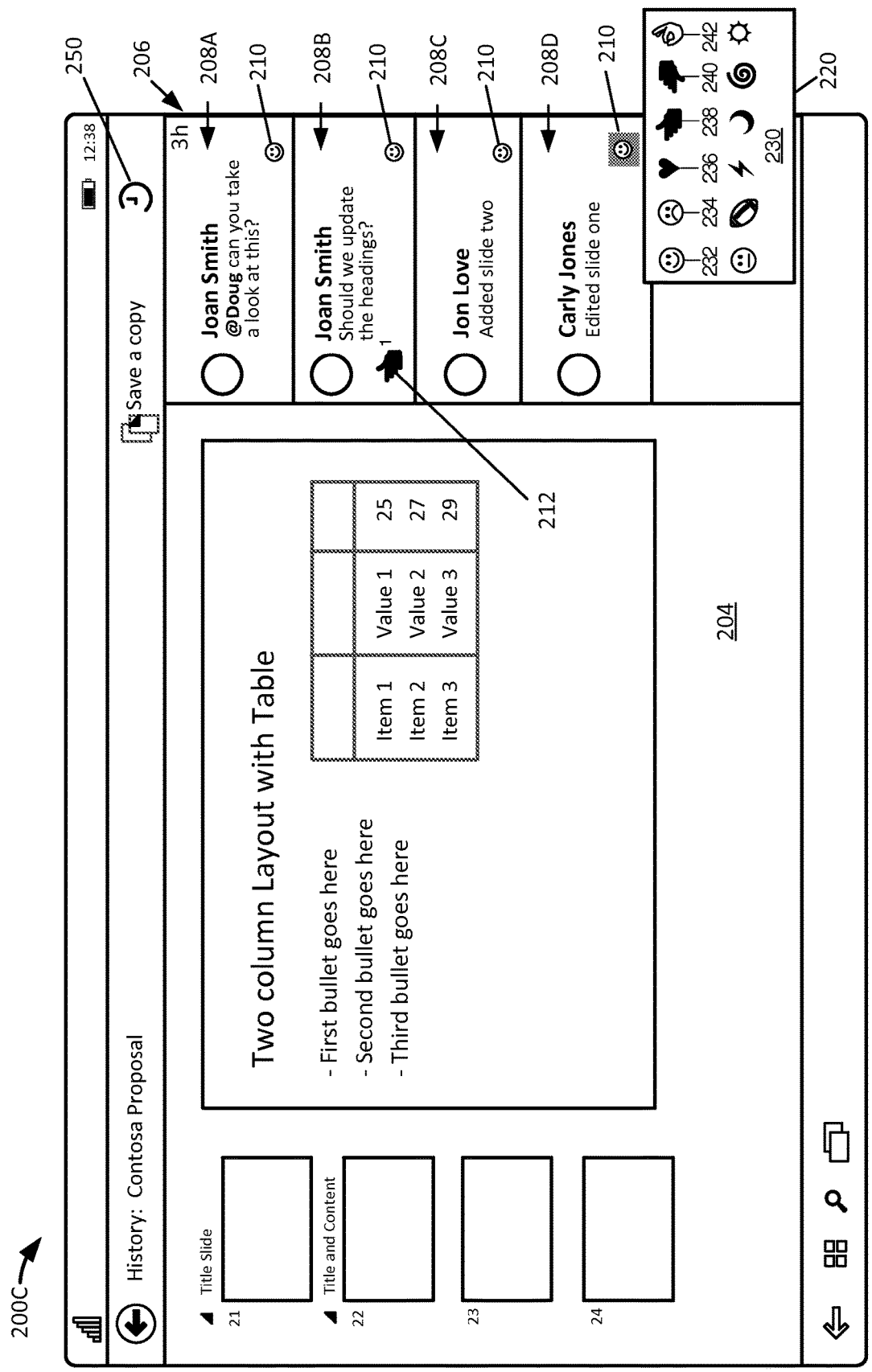
FIG. 2C illustrates another view in the progression of views of the electronic slide application of FIG. 2A, according to an example aspect.

Referring now to FIG. 2C, another view 200C in a progression of views of the electronic slide presentation application displayed on a user interface of the client computing device 104, such as a desktop computer, tablet computer or a mobile phone, for example, is shown. As illustrated, the exemplary view 200C of the electronic slide presentation application displayed on the client computing device 104 includes the file 204, the file activity feed 206, the plurality of activities 208A-208D, and the file activity icon 250. The plurality of activities 208A-208D described relative to FIG. 2C include the same and/or similar functionality as the plurality of activities 208A-208D described above relative to FIGS. 2A-2B. For example, one or more of the plurality of activities 208A-208D may include the emoji icon 210 displayed therein. In another example, the activity 208B may include the emoji icon 210 and the voting emoji 212 displayed therein.

As shown in FIG. 2C, the emoji icon 210 displayed within activity 208D is selected. As such, in response to receiving a selection of the emoji icon 210, the navigable menu 220 including a plurality of emoji 230 may be displayed. The navigable menu 220 including the plurality of emoji 230 may be rendered and/or displayed on the user interface. In some examples, navigable menu 220 including the plurality of emoji 230 may be rendered and/or displayed within the file 204. In other examples, navigable menu 220 including the plurality of emoji 230 may be rendered and/or displayed within the file 204 next to the file contents within the canvas. In one case, the navigable menu 220 including the plurality of emoji 230 may be rendered and/or displayed over the file activity feed 206.

As discussed above, in one example, the navigable menu 220 may include suggested emoji. In the example illustrated in FIG. 2C, the navigable menu 220 includes a first suggested emoji 232, a second suggested emoji 234, a third suggested emoji 236, a fourth suggested emoji 238, a fifth suggested emoji 240, and a sixth suggested emoji 242. In one example, the first suggested emoji 232, the second suggested emoji 234, the third suggested emoji 236, the fourth suggested emoji 238, the fifth suggested emoji 240, and the sixth suggested emoji 242 are presented in a selected and/or preferred portion (e.g., the top or first row) of the navigable menu 220. As discussed above, displaying the navigable menu 220 may include suggesting one or more emoji based on activity metadata. In one example, as illustrated in FIG. 2C, displaying the navigable menu 220 may include suggesting one or more emoji based on a type of activity. Activity 208D is an activity of type "edit." In this regard, content of the file 204 may have been changed. In one example, in response to receiving a selection of the activity 208D, the edited content may be displayed within the file 204 such that a user/co-author may view the edited content and corresponding metadata. In another example, in response to receiving a selection of the activity 208D, the activity 208D may be expanded to show and/or display the edited content. In this regard, a user/co-author may present an in-inline reaction (e.g., present a reaction within the activity 208D) to the edits made to slide one.

In the example illustrated in FIG. 2C, the first suggested emoji 232 is a happy face, the second suggested emoji 234 is a sad face, the third suggested emoji 236 is a heart, the fourth suggested emoji 238 is a thumbs up, the fifth suggested emoji 240 is a thumbs down, and the sixth suggested emoji 242 is an A-Okay. In this regard, a user/co-author may express whether she is happy or unhappy with the edits, whether she agrees or disagrees with the edits, whether she loves the edits and/or whether she is okay with the edits. As such, the first suggested emoji 232, the second suggested emoji 234, the third suggested emoji 236, the fourth suggested emoji 238, the fifth suggested emoji 240, and the sixth suggested emoji 242 are suggested based on the type of activity (e.g., an edit). In turn, a user/co-author may quickly and easily identify emoji in the navigable menu 220 for expressing emotion and/or presenting an in-line reaction relative to the edits made to slide one.

Figure 2D:
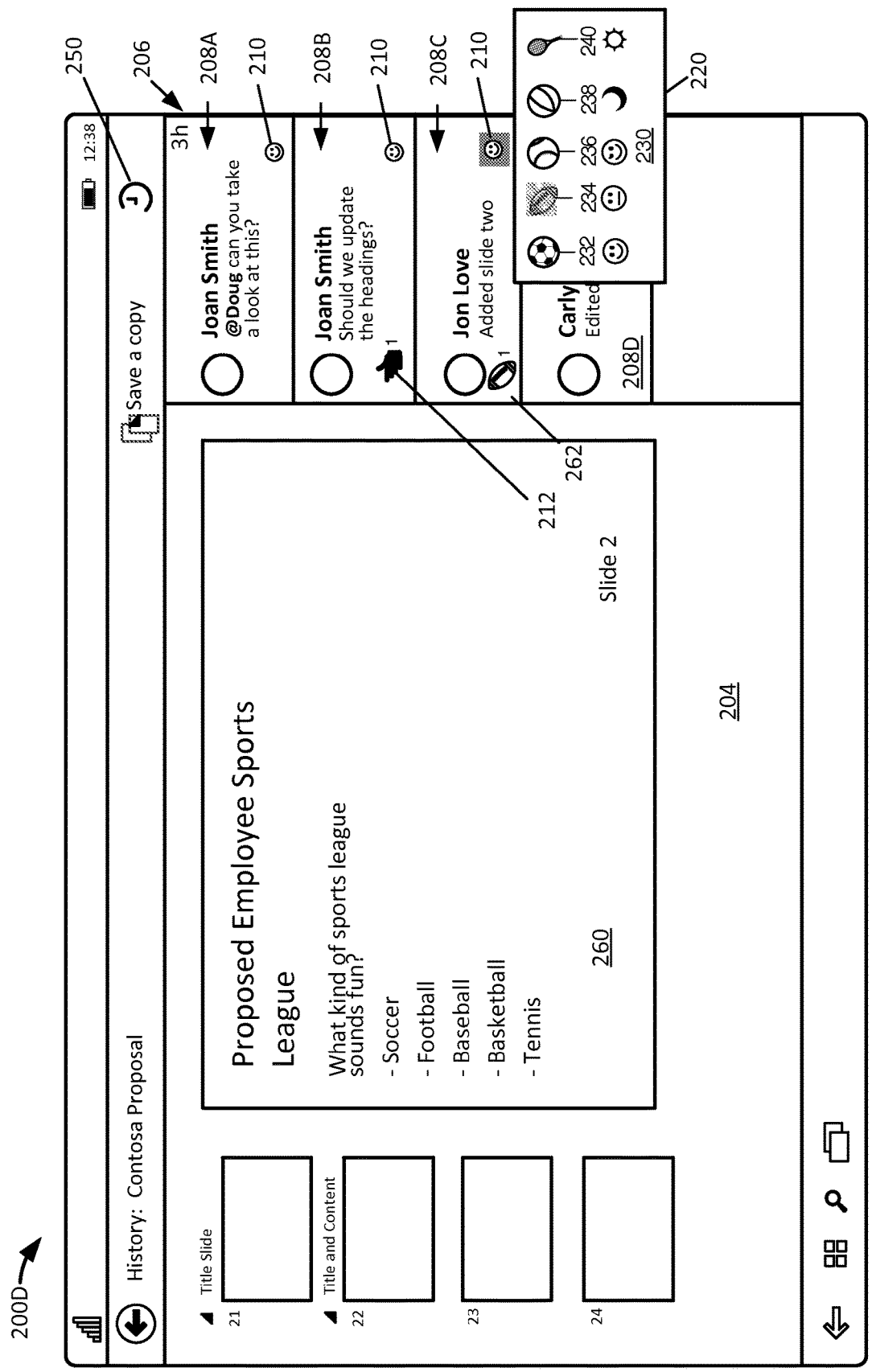
FIG. 2D illustrates another view in the progression of views of the electronic slide application of FIG. 2A, according to an example aspect.

Referring now to FIG. 2D, another view 200D in a progression of views of the electronic slide presentation application displayed on a user interface of the client computing device 104, such as a desktop computer, tablet computer or a mobile phone, for example, is shown. As illustrated, the exemplary view 200D of the electronic slide presentation application displayed on the client computing device 104 includes the file 204, the file activity feed 206, the plurality of activities 208A-208D, and the file activity icon 250. The plurality of activities 208A-208D described relative to FIG. 2D include the same and/or similar functionality as the plurality of activities 208A-208D described above relative to FIGS. 2A-2C. For example, one or more of the plurality of activities 208A-208D may include the emoji icon 210 displayed therein. In another example, the activity 208B may include the emoji icon 210 and the voting emoji 212 displayed therein.

As shown in FIG. 2D, the emoji icon 210 displayed within activity 208C is selected. As such, in response to receiving a selection of the emoji icon 210, the navigable menu 220 including a plurality of emoji 230 may be displayed. The navigable menu 220 including the plurality of emoji 230 may be rendered and/or displayed on the user interface. In some examples, navigable menu 220 including the plurality of emoji 230 may be rendered and/or displayed within the file 204. In other examples, navigable menu 220 including the plurality of emoji 230 may be rendered and/or displayed within the file 204 next to the file contents within the canvas. In one case, the navigable menu 220 including the plurality of emoji 230 may be rendered and/or displayed over the file activity feed 206.

As discussed above, in one example, the navigable menu 220 may include suggested emoji. In the example illustrated in FIG. 2D, the navigable menu 220 includes a first suggested emoji 232, a second suggested emoji 234, a third suggested emoji 236, a fourth suggested emoji 238, and a fifth suggested emoji 240. In one example, the first suggested emoji 232, the second suggested emoji 234, the third suggested emoji 236, the fourth suggested emoji 238, and the fifth suggested emoji 240 are presented in a selected and/or preferred portion (e.g., the top or first row) of the navigable menu 220. As discussed above, displaying the navigable menu 220 may include suggesting one or more emoji based on a type of content within the file 204. Activity 208C is an activity of type "added content." In this regard, content of the file 204 may have been added. In one example, in response to receiving a selection of the activity 208C, the added content may be displayed within the file 204 such that a user/co-author may view the added content and corresponding metadata. In another example, in response to receiving a selection of the activity 208C, the activity 208C may be expanded to show and/or display the added content. In this regard, a user/co-author may present an in-inline reaction (e.g., present a reaction within the activity 208C) to the added content (e.g., slide two).

In the example illustrated in FIG. 2D, the added content may include a proposed employee sports league on a slide two 260 of the file 204. For example, the content in slide two 260 may include sports suggestions for playing in an engineering sports league. As such, the first suggested emoji 232 is a soccer ball, the second suggested emoji 234 is a football, the third suggested emoji 236 is a baseball, the fourth suggested emoji 238 is a basketball, and the fifth suggested emoji 240 is a tennis racquet. In this regard, a user/co-author may express what type of sports league she would like to play in (e.g., a soccer sports league, a football sports league, a baseball sports league, a basketball sports league, or a tennis sports league) using the suggested emoji. As such, the first suggested emoji 232, the second suggested emoji 234, the third suggested emoji 236, the fourth suggested emoji 238, and the fifth suggested emoji 240 are suggested based on a type of content within the file 204 (e.g., content including sports league suggestions). For example, the emoji system 100 may perform a natural language or other analysis to determine that the slide content includes sports language. In other examples, the emoji system 100 may perform a natural language or other analysis to determine that a comment or other activity includes a question, thereby determining that the voting emoji are suitable for suggestion. Based on the suggested emoji, a user/co-author may quickly and easily identify emoji in the navigable menu 220 for expressing emotion and/or presenting an in-line reaction relative to the content within the file 204. In another example, a user/co-author may suggest an alternative sports league by selecting an emoji, either from additional suggested sports emoji or from a plurality of emoji that are presented but not suggested.

As illustrated in FIG. 2D, the second suggested emoji 234 is selected. In this regard, in response to receiving a selection of the second suggested emoji 234, the second suggested emoji 234 (e.g., the football emoji 262) is displayed within the activity 208C. The football emoji 262 includes a number 1 to indicate a number of users/co-authors who agree with the suggested football emoji 262. In this example, one user/co-author agrees with the suggested football emoji 262. As such, users and/or co-authors of the file 204 may present in-line reactions to the plurality of activities 208A-208D using one or more emoji (e.g., using one of the plurality of emoji 230). In turn, users and/or co-authors may express emotion and/or feeling while collaborating on files created with information processing applications.

In other examples, displaying the navigable menu 220 may include suggesting one or more emoji based on a user/co-author identifier, user/co-author favorite emoji, and/or a history of (e.g., previously) used emoji. In another example, the author of the comment or other activity may be permitted to prioritize certain emoji icons for presentation along with the comment or other activity. It is appreciated that while specific examples for suggesting emoji are described herein, the discussion of suggesting emoji is exemplary only and should not be considered as limiting. Any number of and/or type of information may be used to suggest emoji in a navigable menu for presenting in-line reactions to one or more activities associated with a file. For example, while an example of activity metadata including a type of activity for suggesting emoji is described herein, any of the activity metadata described herein may be used for suggesting emoji.

Figure 3:
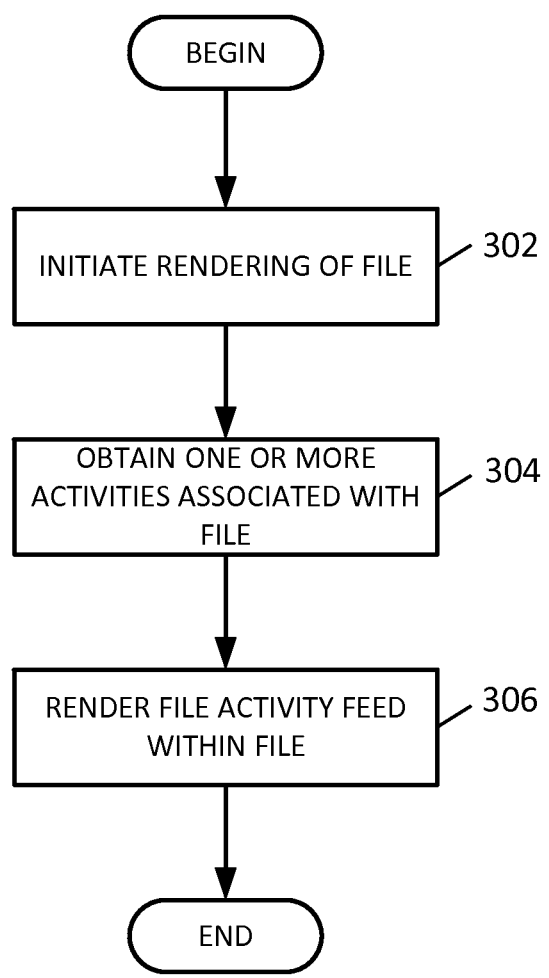
FIG. 3 illustrates an exemplary method for extending emoji reactions into file specific content, according to an example aspect.

Referring now to FIG. 3, an exemplary method 300 for extending emoji reactions into file specific content, according to an example aspect is shown. Method 300 may be implemented on a computing device or a similar electronic device capable of executing instructions through at least one processor. Emoji reactions may be extended into file specific content of any suitable software application. For example, the software application may be one of an email application, a social networking application, project management application, a collaboration application, an enterprise management application, a messaging application, a word processing application, a spreadsheet application, a database application, a presentation application, a contacts application, a calendaring application, etc. This list is exemplary only and should not be considered as limiting. Any suitable application for extending emoji reactions into file specific content may be utilized by method 300, including combinations of the above-listed applications.

Method 300 may begin at operation 302, where rendering of a file created with an application on a user interface is initiated. In one example, the file may be rendered on a client computing device. In one example, an application may include any application suitable for collaboration and/or co-authoring such as a word processing application, spreadsheet application, electronic slide presentation application, email application, chat application, voice application, and the like. In one case, a file associated with and/or created with the application may include a word document, a spreadsheet, an electronic slide presentation, an email, a chat conversation, and the like. In one example, an information processing application may include a word processing application, a spreadsheet application, and an electronic slide presentation.

When the file created with an application is rendered on a user interface, flow proceeds to operation 304 where one or more activities associated with the file are obtained. In one example, the one or more activities include corresponding activity metadata. In one case, the one or more activities associated with the file created with the application are obtained in response to receiving a selection of an activity feed icon. In one example, a client computing device and/or a user interface component may obtain the one or more activities from one or more sources. For example, the client computing device and/or the user interface component may obtain the one or more activities from a server computing device. The server computing device may include a storage platform and a data store. In one example, the storage platform may be configured to store, manage, and access data and/or information associated with the emoji system. For example, the storage platform may store one or more files and/or one or more activities associated with a file in a data store. In another case, the one or more activities may be obtained from an activity service. The activity service may be configured to receive, store, create, generate, update, manage, and access one or more activities and/or information associated with the emoji system.

When one or more activities associated with the file are obtained, flow proceeds to decision operation 306 where a file activity feed including the one or more activities associated with the file is rendered within the file. In one example, at least one of the one or more activities include at least an emoji icon displayed within the one or more activities. In response to receiving a selection of the emoji icon, a navigable menu including a plurality of emoji may be displayed. In one case, displaying the navigable menu comprises suggesting one or more emoji based on a type of activity. In another case, displaying the navigable menu comprises suggesting one or more emoji based on a type of content within the file. In yet another case, displaying the navigable menu comprises suggesting one or more emoji based on an existing emoji in a reaction stack. In one example, displaying the navigable menu including at least the suggested emoji comprises presenting the suggested emoji in a selected and/or preferred (e.g., top) portion of the navigable menu. In another example, the file activity feed including the one or more activities associated with the file is rendered within the file in response to receiving a selection of an activity feed icon.

Figure 4:
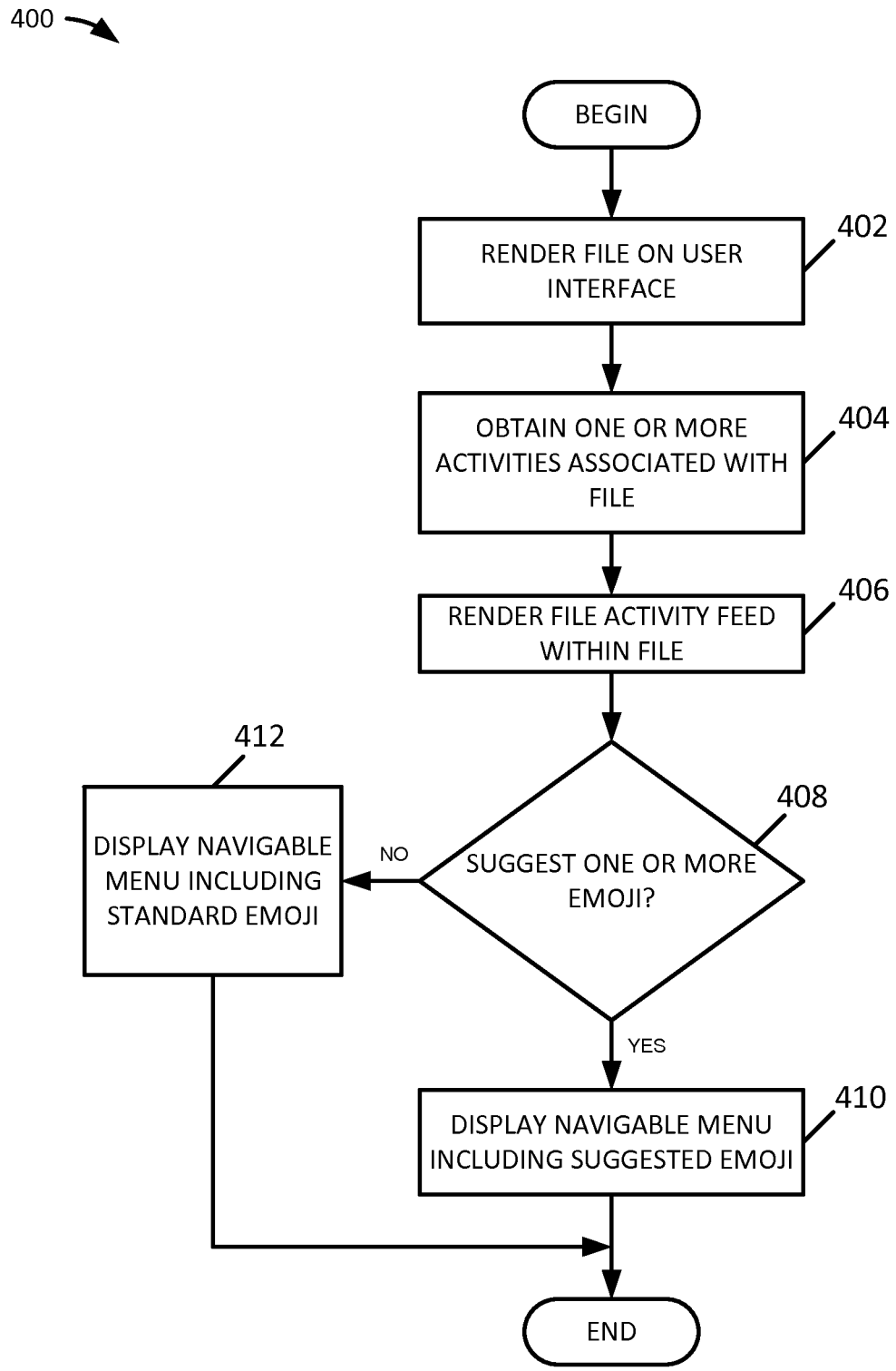
FIG. 4 illustrates an exemplary method for suggesting one or more emoji within a file created with an application, according to an example aspect.

Referring now to FIG. 4, an exemplary method 400 for suggesting one or more emoji within a file created with an application, according to an example aspect is shown. Method 400 may be implemented on a computing device or a similar electronic device capable of executing instructions through at least one processor. Method 400 begins at operation 402 where a file created with an application is rendered on a user interface. In one example, the file may be rendered on a client computing device. In one example, an application may include any application suitable for collaboration and/or co-authoring such as a word processing application, spreadsheet application, electronic slide presentation application, email application, chat application, voice application, and the like. In one case, a file associated with and/or created with the application may include a word document, a spreadsheet, an electronic slide presentation, an email, a chat conversation, and the like. In one example, an information processing application may include a word processing application, a spreadsheet application, and an electronic slide presentation.

When the file created with an application is rendered on a user interface, flow proceeds to operation 404 where one or more activities associated with the file are obtained. In one example, the one or more activities include corresponding activity metadata. The corresponding activity metadata may include at least one of an identifier, a timestamp, a type, a location, and a link. In one example, a client computing device and/or a user interface component may obtain the one or more activities from one or more sources. For example, the client computing device and/or the user interface component may obtain the one or more activities from a server computing device. The server computing device may include a storage platform and a data store. In one example, the storage platform may be configured to store, manage, and access data and/or information associated with the emoji system. For example, the storage platform may store one or more files and/or one or more activities associated with a file in a data store. In another case, the one or more activities may be obtained from an activity service. The activity service may be configured to receive, store, create, generate, update, manage, and access one or more activities and/or information associated with the emoji system.

When one or more activities associated with the file created with the application are obtained, flow proceeds to decision operation 406 where a file activity feed including the one or more activities associated with the file is rendered within the file. In one case, the file activity feed is rendered next to a canvas of the file. In another case, the file activity feed is rendered within the file. In one example, the one or more activities include at least an emoji icon displayed within at least one of the one or more activities. In response to receiving a selection of the emoji icon, a navigable menu including a plurality of emoji may be displayed. In one example, at least one of the plurality of emoji includes a voting emoji for voting on the one or more activities associated with the file.

When the file activity feed including the one or more activities associated with the file is rendered within the file, flow proceeds to decision operation 408 where it is determined whether to suggest one or more emoji. In one example, it may be determined whether to suggest one or more emoji based on at least one of activity metadata, a type of content within the file, and an existing emoji in a reaction stack. For example, it may be determined to suggest one or more emoji when one or more emoji correspond to and/or are associated with at least one of the activity metadata, the type of content within the file, and the existing emoji in the reaction stack. In another example, it may be determined to suggest one or more emoji when one or more emoji would facilitate expressing emotion and/or providing a reaction that is consistent with at least one of the activity metadata, the type of content within the file, and the existing emoji in the reaction stack.

When it is determined to suggest one or more emoji based on at least one of the activity metadata, a type of content within the file, and an existing emoji in a reaction stack, flow proceeds to operation 410 where a navigable menu including at least the suggested emoji is displayed. In one case, displaying the navigable menu comprises suggesting one or more emoji based on a type of activity. In another case, displaying the navigable menu comprises suggesting one or more emoji based on a type of content within the file. In yet another case, displaying the navigable menu comprises suggesting one or more emoji based on an existing emoji in a reaction stack. In one example, displaying the navigable menu including at least the suggested emoji comprises presenting the suggested emoji in a selected and or preferred (e.g., top) portion of the navigable menu. In one implementation, the existing emoji in the reaction stack is displayed within the one or more activities associated with the file.

When it is determined not to suggest one or more emoji based on at least one of the activity metadata, a type of content within the file, and an existing emoji in a reaction stack, flow proceeds to operation 412 where a navigable menu including standard emoji is displayed. For example, the plurality of emoji may include a set of standard emoji. In one case, the set of standard emoji are part of a Unicode standard as known by those skilled in the art. In this regard, a set of standard emoji may be displayed within the navigable menu (e.g., without any suggested emoji).

The term rendering as used herein generally refers to the various capabilities employed in various computing architectures to assemble information that can then be used by other capabilities to generate an image or images. Within the context of methods 400 and 500, for example, rendering a file or a file activity feed, for example, generally refers to assembling the information or data used to generate an image or images that together result in the filter preference pane. Animation or other dynamics may also be used to achieve certain effects.

However, it may be appreciated that other perspectives on rendering may be considered within the scope of the present disclosure. For example, rendering as used herein may also, in some scenarios, be considered to refer to the various capabilities employed by various computing architectures to generate an image or images from information assembled for that purpose. With respect to the methods 300 and 400, rendering a file and/or a file activity feed may refer to generating an image or images, from information assembled for that purpose, that together result in the file and/or file activity feed, which can then be displayed.

It may also be appreciated that rendering in some scenarios may refer to a combination of the aforementioned possibilities. For example, rendering in some scenarios may refer to both assembling the information used to generate an image or images for a file and/or file activity feed and then generating the image or images of the file and/or file activity feed. In addition, a wide variety of other steps, processes, and stages may occur within the context of presenting views of an application, all of which may be considered part of presenting a view. Thus, yet one other variation on methods 300 and 400 includes, but is not limited to, presenting a file on a user interface, obtaining one or more activities, and presenting a file activity feed.

Figure 5:
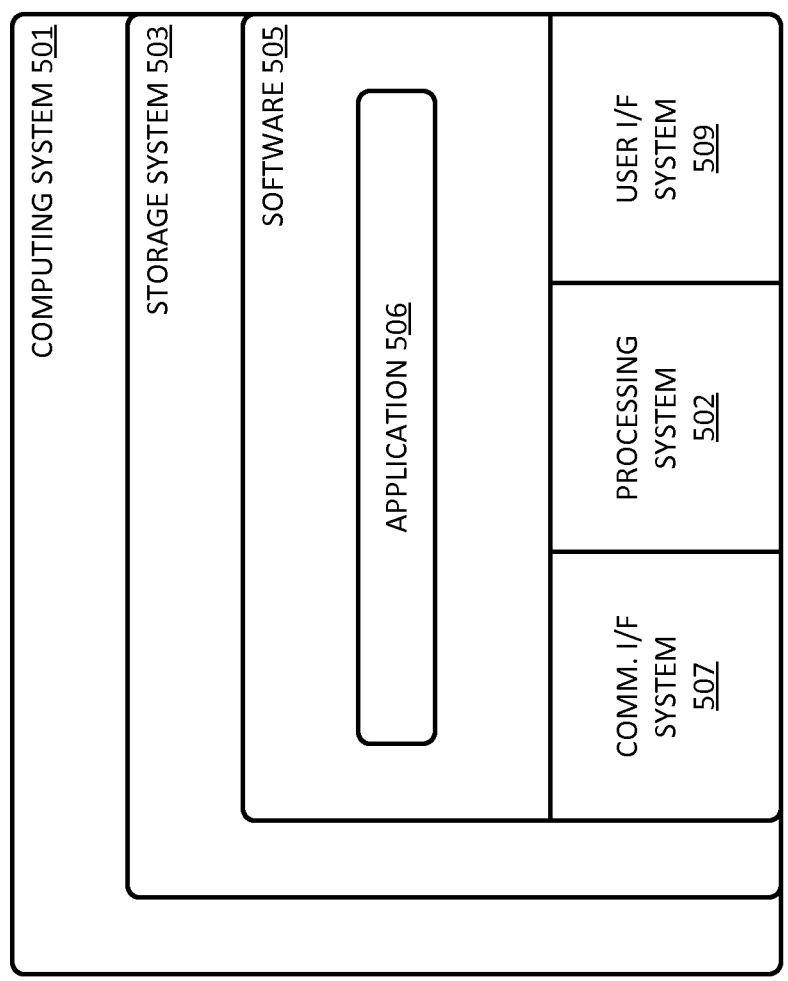
FIG. 5 illustrates a computing system suitable for implementing the enhanced emoji technology disclosed herein, including any of the environments, architectures, elements, processes, user interfaces, and operational scenarios and sequences illustrated in the Figures and discussed below in the Technical Disclosure.

FIG. 5 illustrates computing system 501 that is representative of any system or collection of systems in which the various applications, services, scenarios, and processes disclosed herein may be implemented. Examples of computing system 501 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 501 may be implemented as a single apparatus, system, or device or may be implemented in a distributed manner as multiple apparatuses, systems, or devices. Computing system 501 includes, but is not limited to, processing system 502, storage system 503, software 505, communication interface system 507, and user interface system 509. Processing system 502 is operatively coupled with storage system 503, communication interface system 507, and user interface system 509.

Processing system 502 loads and executes software 505 from storage system 503. Software 505 includes application 506, which is representative of the applications discussed with respect to the preceding FIGS. 1-4, including electronic slide applications and word processing applications described herein. When executed by processing system 502 to enhance emoji, software 505 directs processing system 502 to operate as described herein for at least the various processes, operational scenarios, and sequences discussed in the foregoing implementations. Computing system 501 may optionally include additional devices, features, or functionality not discussed for purposes of brevity.

Referring still to FIG. 5, processing system 502 may comprise a micro-processor and other circuitry that retrieves and executes software 505 from storage system 503. Processing system 502 may be implemented within a single processing device, but may also be distributed across multiple processing devices or sub-systems that cooperate in executing program instructions. Examples of processing system 502 include general purpose central processing units, application specific processors, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device, but may also be implemented across multiple storage devices or sub-systems co-located or distributed relative to each other. Storage system 503 may comprise additional elements, such as a controller, capable of communicating with processing system 502 or possibly other systems.

Software 505 may be implemented in program instructions and among other functions may, when executed by processing system 502, direct processing system 502 to operate as described with respect to the various operational scenarios, sequences, and processes illustrated herein. For example, software 505 may include program instructions for implementing enhanced emoji.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software, virtual machine software, or other application software, in addition to or that include application 506. Software 505 may also comprise firmware or some other form of machine-readable processing instructions executable by processing system 502.

In general, software 505 may, when loaded into processing system 502 and executed, transform a suitable apparatus, system, or device (of which computing system 501 is representative) overall from a general-purpose computing system into a special-purpose computing system customized to facilitate enhanced emoji. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary storage, as well as other factors.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 507 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 509 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 509. In some cases, the input and output devices may be combined in a single device, such as a display capable of displaying images and receiving touch gestures. The aforementioned user input and output devices are well known in the art and need not be discussed at length here.

User interface system 509 may also include associated user interface software executable by processing system 502 in support of the various user input and output devices discussed above. Separately or in conjunction with each other and other hardware and software elements, the user interface software and user interface devices may support a graphical user interface, a natural user interface, or any other type of user interface.

Communication between computing system 501 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Among other examples, the present disclosure presents systems comprising: one or more computer readable storage media; and program instructions stored on the one or more computer readable storage media that, when executed by at least one processor, cause the at least one processor to at least: initiate rendering of a file created with an application on a user interface; obtain one or more activities associated with the file, wherein the one or more activities include corresponding activity metadata; and render, within the file, a file activity feed including the one or more activities associated with the file, wherein the one or more activities include at least an emoji icon displayed within at least one of the one or more activities. In further examples, the application includes at least one of a word processing application, a spreadsheet application, and an electronic slide presentation application. In further examples, the file activity feed is rendered next to a canvas of the file. In further examples, the one or more activities are associated with a client computing device, and wherein the one or more activities associated with the client computing device include at least one of messaging, communication activities, comments, email activities, a presentation of the file, a printing of the file, and co-authoring of the file. In further examples, the one or more activities are associated with a server computing device, and wherein the one or more activities associated with the server computing device include at least one of receiving a shared file, renaming a file, editing a file, sharing a file, and restoring a file. In further examples, the activity metadata includes at least one of an identifier, a timestamp, a type, a location, and a link. In further examples, the one or more activities are obtained from one or more sources. In further examples, the one or more sources include an activity service. In further examples, in response to receiving a selection of the emoji icon, the program instructions further cause the least one processor to display a navigable menu including a plurality of emoji.

Further aspects disclosed herein provide an exemplary method for extending emoji reactions into file specific content, the method comprising: initiating rendering of a file created with an application on a user interface; in response to receiving a selection of an activity feed icon: obtaining one or more activities associated with the file, wherein the one or more activities include corresponding activity metadata; and rendering, within the file, a file activity feed including the one or more activities associated with the file, wherein the one or more activities include at least an emoji icon displayed within at least one of the one or more activities. In further examples, in response to receiving a selection of the emoji icon, the computer-implemented method further comprises displaying a navigable menu including a plurality of emoji. In further examples, at least one of the plurality of emoji includes a voting emoji for voting on the at least one of the one or more activities associated with the file. In further examples, displaying the navigable menu comprises suggesting one or more emoji based on a type of activity. In further examples, displaying the navigable menu comprises suggesting one or more emoji based on a type of content within the file. In further examples, displaying the navigable menu comprises suggesting one or more emoji based on an existing emoji in a reaction stack. In further examples, the application includes at least one of a word processing application, a spreadsheet application, and an electronic slide application.

Additional aspects disclosed herein provide exemplary systems comprising: at least one processor; and memory encoding computer executable instructions that, when executed by the at least one processor, perform a method for suggesting one or more emoji within a file created with an application, the method comprising: rendering, on a user interface, the file; obtaining one or more activities associated with the file, wherein the one or more activities include corresponding activity metadata; rendering, within the file, a file activity feed including the one or more activities associated with the file; determining whether to suggest one or more emoji based on at least one of the activity metadata, a type of content within the file, and an existing emoji in a reaction stack; and in response to determining to suggest one or more emoji based on at least one of the activity metadata, the type of content within the file, and the existing emoji in a reaction stack, displaying a navigable menu including at least the suggested emoji. In further examples, displaying the navigable menu including at least the suggested emoji comprises presenting the suggested emoji in a selected portion of the navigable menu. In further examples, the one or more activities include at least an emoji icon displayed within at least one of the one or more activities. In further examples, the existing emoji in the reaction stack is displayed within at least one of the one or more activities associated with the file.

Techniques for extending emoji reactions into file specific content are described. Although aspects are described in language specific to structural features and/or methodological acts, it is to be understood that the aspects defined in the appended claims are not necessarily limited to the specific features or acts described above. Rather, the specific features and acts are disclosed as example forms of implementing the claimed aspects.

A number of methods may be implemented to perform the techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods may be implemented via interaction between various entities discussed above with reference to the touchable user interface.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Additionally, while the aspects may be described in the general context of enhanced emoji systems that execute in conjunction with an application program that runs on an operating system on a computing device, those skilled in the art will recognize that aspects may also be implemented in combination with other program modules. In further aspects, the aspects disclosed herein may be implemented in hardware.

Generally, program modules include routines, programs, components, data structures, and other types of structures that perform particular tasks or implement particular abstract data types. Moreover, those skilled in the art will appreciate that aspects may be practiced with other computer system configurations, including hand-held devices, multiprocessor systems, microprocessor-based or programmable consumer electronics, minicomputers, mainframe computers, and comparable computing devices. Aspects may also be practiced in distributed computing environments where tasks are performed by remote processing devices that are linked through a communications network. In a distributed computing environment, program modules may be located in both local and remote memory storage devices.

Aspects may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or compact servers, an application executed on a single computing device, and comparable systems.

What is claimed is:

1. A system comprising:
   one or more computer readable storage media; and
   program instructions stored on the one or more computer readable storage media that, when executed by at least one processor, cause the at least one processor to at least:
   initiate rendering of a file created with an application on a user interface;
   obtain one or more activities associated with the file, wherein the one or more activities include corresponding activity metadata;
   render, within the file, a file activity feed including the one or more activities associated with the file, wherein the one or more activities include at least an emoji icon displayed within at least one of the one or more activities for extending emoji reactions into file specific content;
   perform an analysis on the one or more activities to determine whether to suggest one or more emoji based on at least one of the activity metadata and an activity type;
   when it is determined to suggest the one or more emoji, display a first navigable menu including at least the suggested emoji; and
   when it is determined not to suggest the one or more emoji, display a second navigable menu including a set of standard emoji.

2. The system of claim 1, wherein the application includes at least one of a word processing application, a spreadsheet application, and an electronic slide presentation application.

3. The system of claim 1, wherein the file activity feed is rendered next to a canvas of the file.

4. The system of claim 1, wherein the one or more activities are associated with a client computing device, and wherein the one or more activities associated with the client computing device include at least one of messaging, communication activities, comments, email activities, a presentation of the file, a printing of the file, and co-authoring of the file.

5. The system of claim 1, wherein the one or more activities are associated with a server computing device, and wherein the one or more activities associated with the server computing device include at least one of receiving a shared file, renaming a file, editing a file, sharing a file, and restoring a file.

6. The system of claim 1, wherein the activity metadata includes at least one of an identifier, a timestamp, a type, a location, and a link.

7. The system of claim 1, wherein the one or more activities are obtained from one or more sources.

8. The system of claim 7, wherein the one or more sources include an activity service.

9. The system of claim 1, wherein the first navigable menu includes one or more emoji based on a type of activity.

10. The system of claim 1, wherein the first navigable menu includes one or more emoji based on a type of content within the file.

11. The system of claim 1, wherein the first navigable menu includes one or more emoji based on an existing emoji in a reaction stack.

12. A computer-implemented method for extending emoji reactions into file specific content, the method comprising:
   initiating rendering of a file created with an application on a user interface;
   in response to receiving a selection of an activity feed icon:
      obtaining one or more activities associated with the file, wherein the one or more activities include corresponding activity metadata;
      rendering, within the file, a file activity feed including the one or more activities associated with the file, wherein the one or more activities include at least an emoji icon displayed within at least one of the one or more activities for extending emoji reactions into file specific content;
      performing an analysis on the one or more activities to determine whether to suggest one or more emoji based on at least one of the activity metadata and an activity type;
      when it is determined to suggest the one or more emoji, displaying a first navigable menu including at least the suggested emoji; and
      when it is determined not to suggest the one or more emoji, displaying a second navigable menu including a set of standard emoji.

13. The method of claim 12, wherein displaying the first navigable menu comprises suggesting one or more emoji based on a type of activity.

14. The method of claim 12, wherein displaying the first navigable menu comprises suggesting one or more emoji based on a type of content within the file.

15. The method of claim 12, wherein displaying the first navigable menu comprises suggesting one or more emoji based on an existing emoji in a reaction stack.

16. The method of claim 12, wherein the application includes at least one of a word processing application, a spreadsheet application, and an electronic slide application.

17. A system comprising:
   at least one processor; and
   memory encoding computer executable instructions that, when executed by the at least one processor, perform a method for suggesting one or more emoji within a file created with an application, the method comprising:

rendering, on a user interface, the file;

obtaining one or more activities associated with the file, wherein the one or more activities include corresponding activity metadata;

rendering, within the file, a file activity feed including the one or more activities associated with the file;

determining whether to suggest one or more emoji based on at least one of the activity metadata and an activity type;

when it is determined to suggest one or more emoji based on at least one of the activity metadata and the activity type, displaying a first navigable menu including at least the suggested emoji; and when it is determined not to suggest one or more emoji based on at least one of the activity metadata and the activity type, displaying a second navigable menu including a set of standard emoji.

18. The system of claim 17, wherein displaying the first navigable menu including at least the suggested emoji comprises presenting the suggested emoji in a selected portion of the first navigable menu.

19. The system of claim 17, wherein the one or more activities include at least an emoji icon displayed within at least one of the one or more activities.

20. The system of claim 17, wherein displaying the first navigable menu including at least the suggested emoji comprises presenting the suggested emoji in a top portion of the first navigable menu.

* * * * *